(12) United States Patent
Robl et al.

(10) Patent No.: US 12,227,698 B2
(45) Date of Patent: Feb. 18, 2025

(54) METHOD OF MULTI-STAGE FRACTURING OF SUBTERRANEAN FORMATION AND SLURRY FOR THAT METHOD

(71) Applicant: UNIVERSITY OF KENTUCKY RESEARCH FOUNDATION, Lexington, KY (US)

(72) Inventors: Thomas L Robl, Sadieville, KY (US); Anne Oberlink, Lexington, KY (US); Robert Jewell, Lexington, KY (US); Tristana Duvallett, Lexington, KY (US); Lance Cook, Houston, TX (US); Lev Ring, Bellaire, TX (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 18/006,193

(22) PCT Filed: Jul. 26, 2021

(86) PCT No.: PCT/US2021/043147
§ 371 (c)(1),
(2) Date: Jan. 20, 2023

(87) PCT Pub. No.: WO2022/020799
PCT Pub. Date: Jan. 27, 2022

(65) Prior Publication Data
US 2023/0257646 A1    Aug. 17, 2023

Related U.S. Application Data

(60) Provisional application No. 63/055,971, filed on Jul. 24, 2020.

(51) Int. Cl.
*C09K 8/80* (2006.01)
*E21B 43/267* (2006.01)

(52) U.S. Cl.
CPC ............ *C09K 8/80* (2013.01); *E21B 43/267* (2013.01)

(58) Field of Classification Search
CPC ............ C09K 8/80; C09K 8/032; C09K 8/62; C09K 2208/10; E21B 43/26; E21B 43/267
See application file for complete search history.

(56) References Cited

U.S. PATENT DOCUMENTS

| 2014/0318778 A1 | 10/2014 | Skala et al. |
| 2015/0299560 A1 | 10/2015 | Robl et al. |

(Continued)

FOREIGN PATENT DOCUMENTS

| CA | 3017115 A1 | 9/2018 | |
| CA | 2922265 C | * 12/2018 | ............ C09K 8/62 |

OTHER PUBLICATIONS

Translation of CN 103159464. (Year: 2013).*

(Continued)

*Primary Examiner* — Zakiya W Bates
(74) *Attorney, Agent, or Firm* — Stites & Harbison PLLC; Warren D. Schickli (57) ABSTRACT

A method of hydraulic fracturing of a subterranean formation having a well bore includes steps of sequentially injecting different slurries with nano, micro and then macro sized proppants generated from coal ash into the well bore in order to enhance oil and gas production from fracking. A slurry useful in the method includes (a) water, (b) coal combustion fly ash particles that have a mean particle size (d50) of about 6 microns and (c) a surfactant.

13 Claims, 4 Drawing Sheets

(56) References Cited

U.S. PATENT DOCUMENTS

2018/0073342 A1* 3/2018 Nguyen ............... E21B 43/267
2018/0362841 A1 12/2018 Cook

OTHER PUBLICATIONS

Robl, et al., Use of Fly Ash as a Proppant in Fracking of Unconventional Oil & Gas Wells, University of Kentucky Center for Applied Energy, Jun. 11, 2019, pp. 1-33.

* cited by examiner

METHOD OF MULTI-STAGE FRACTURING OF SUBTERRANEAN FORMATION AND SLURRY FOR THAT METHOD

RELATED APPLICATION

This application is a $371 National State Application of PCT/US2021/043147 filed Jan. 27, 2021 which claims priority to U.S. Provisional Patent Application Ser. No. 63/055,971 filed on Jul. 24, 2020, which are hereby incorporated by reference in its entirety.

TECHNICAL FIELD

This document relates generally to the field of fracking to enhance oil and gas production from subterranean formations.

BACKGROUND

The development of "fracking" which took place over the last 50 years, has transformed the United States from a net energy importing country to self-sufficiency, and more recently, to an energy exporting country. Fracking combines directional drilling and fracturing. The last step in this process is the stabilization of the well by pumping proppants (sand slurries) to hold open the fractures. Fracking produces what is essentially an unlimited supply of oil and gas, but is more expensive than conventional production methods, due to the large power requirements to drive the fracking, the cost of proppants and post frac well clean up.

Although fracking has opened entirely new energy resources it does have one significant drawback compared to conventional oil and gas production. That is, oil and gas yields decline at a comparatively greater rate, resulting in a larger recovery cost per barrel or per million. The cause is well understood. The micro fractures that produce the bulk of oil and gas heal or close over time as they are unpropped.

This document relates to a new and improved method of multi-stage hydraulic fracturing that addresses this problem directly. Multiple fracking slurries are produced by classifying fresh and/or landfilled fly ash. Fly ash proppant slurries are then injected that progress from very small micron and submicron particles to coarser particles. This approach produces a continuity of propped fractures, from those with only micro and millidarcies of permeability to the larger "gravel pack" channels. The propping of the micro fractures, which produce the bulk of the oil and gas, will sustain well yields at higher rates over a longer time.

SUMMARY

In accordance with the purposes and benefits described herein, a method of hydraulic fracturing of a subterranean formation having a well bore, comprises injecting into the well bore a first slurry containing a first proppant at sufficiently high pressures to fracture the subterranean formation to accept the first slurry, wherein the first proppant is coal combustion fly ash particles that have a mean particle size (d50) of about 6 to 8 microns (μm).

That first proppant may also have (a) a size distribution defined by a d90 of 35 μm and a d10 of 2 μm and more preferably a d90 of about 26 μm and d10 of about 3 μm, (b) a void volume of greater than 40% and more preferably greater than 45% in accordance with standard ISO tests, (c) a particle density of between 2.1 and 2.4 g/cm$^3$ and/or (d) a bulk density of between 0.9 and 1.2 gm/cm$^3$.

In one or more of the many possible embodiments of the method, after the injecting of the first proppant, the method further includes the step of injecting into the well bore a slurry containing a second proppant at sufficiently high pressures to fracture the subterranean formation to accept the second slurry, wherein the second proppant is coal combustion fly ash particles that have a mean particle size (d50) of about 25-35 μm.

That second proppant may also have (a) a size distribution defined by a d90 of 50 to 70 μm and a d10 of 6 to 14 μm and, more preferably, a d90 of 50 to 60 μm and d10 of 6 to 10 μm, (b) a void volume of greater than 45% and more preferably greater than 50% and/or (c) a particle density of between 1.98 and 2.2 g/cm$^3$ or 2.05 and 2.3 gm/cm$^3$ and a bulk density of 0.8 to 1.1 gm/cm$^3$ or 0.9 to 1.2 gm/cm$^3$.

In one or more of the many possible embodiments of the method, after injecting the second proppant, the method further includes injecting into the well bore a third slurry containing a third proppant at sufficiently high pressures to fracture the subterranean formation to accept the third slurry, wherein the third proppant is coal combustion fly ash particles that have a mean particle size (d50) of 70 to 80 μm.

That third proppant may also have (a) a size distribution defined by a d90 of 125 to 145 μm and a d10 of 30 to 40 μm and more preferably a d90 of 115 to 140 μm and d10 20 to 30 μm, (b) a void volume of greater than 50% and, more preferably 55% and/or (c) a bulk density of between 0.75 and 1.0 gm/cm$^3$ or 0.9 and 1.1 gm/cm$^3$.

In at least one possible embodiment of the method, the third proppant injected into the well bore comprises conventional fracking sand or a combination of conventional fracking sand and the third fly ash proppant as described elsewhere in this document.

In accordance with yet another object, a new and improved slurry is provided for hydraulic fracturing of a subterranean formation having a well bore. That slurry comprises, consists of or consists essentially of (1) water, (2) coal combustion fly ash particles that have a mean particle size (d50) of about 6 microns and (3) a surfactant.

In one or more of the many possible embodiments of the slurry, the slurry includes a proppant loading of greater than 12 pounds per gallon. In one or more of the many possible embodiments of the slurry, the slurry includes a proppant loading of 10 to 13 pounds per gallon. In one or more of the many possible embodiments of the slurry, the surfactant is selected from a group consisting of melamine, naphthalene sulfonate, polycarboxylate dispersants or combinations thereof. In one or more of the many possible embodiments of the slurry, the slurry includes additional additives selected from a group consisting of silanes or pH modifiers including acids and bases and combinations thereof.

In the following description, there are shown and described several preferred embodiments of the new and improved method of hydraulic fracturing and slurry for use in that method. As it should be realized, the method and slurry are capable of other, different embodiments and their several details are capable of modification in various, obvious aspects all without departing from the method and slurry as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method of hydraulic fracturing and slurry and together with the description serve to explain certain principles thereof.

Reference will now be made in detail to the present preferred embodiments of the apparatus and method, examples of which are illustrated in the accompanying drawing figures.

DETAILED DESCRIPTION

The new and improved method of hydraulic fracturing of a subterranean formation having a well bore includes steps of sequentially injecting nano, micro and then macro sized proppants generated from coal ash into the well bore in order to enhance oil and gas production from fracking. Both fresh and landfilled fly ash may be used for the proppants. The fly ash proppants and water make a highly stable dense liquid proppant slurry to create a large hydrostatic pressure head which does most of the fracking. The stable dense slurries can be gravity fed into small well diameters, including tubing, ideal for the re-fracking dead wells.

More specifically, the method includes the step of injecting into the well bore a first slurry containing a first proppant at sufficiently high pressures to fracture the subterranean formation to accept the first slurry. In one particularly useful embodiment of the method, the first proppant is coal combustion fly ash particles that have a mean particle size (d50) of about 6 to 8 microns (μm) as determined by laser particle analysis (Malvern Mastersizer 2000) corrected with the Mei scattering equation.

Still further, the first proppant has a size distribution defined by a d90 of 35 μm and a d10 of 2 μm and, more preferably, a d90 of about 26 μm and d10 of about 3 μm. Still further, the first proppant has a void volume of greater than 40% and, more preferably greater than 45%. Void volume is derived from bulk density as determined by Part 10 of ISO 13503-2, Part 2, "Measurement of Properties of Proppants Used in Hydraulic Fracturing and Gravel-Packing Operations" and particle density as determined by helium gas psychometry. Still further, the first proppant has a particle density of between 1.98 and 2.2 g/cm$^3$ or 2.05 and 2.3 gm/cm$^3$ and a bulk density of 0.8 to 1.1 gm/cm$^3$ or 0.9 to 1.2 gm/cm$^3$.

Next, after injecting the first proppant into the well bore, the method includes the step of injecting into the well bore a second slurry containing a second proppant at sufficiently high pressures to fracture the subterranean formation to accept the second slurry, wherein the second proppant is coal combustion fly ash particles that have a mean particle size (d50) of about 25-35 μm.

Still further, the second proppant has a size distribution defined by a d90 of 50 to 70 μm and a d10 of 6 to 14 μm and, more preferably a d90 of 50 to 60 μm and d10 of 6 to 10 μm. Still further, the second proppant has a void volume of greater than 45% and more preferably greater than 50%. Still further, the second proppant has a particle density of between 1.98 and 2.2 g/cm$^3$ or 2.05 and 2.3 gm/cm$^3$ and a bulk density of 0.8 to 1.1 gm/cm$^3$ or 0.9 to 1.2 gm/cm$^3$ Next, after injecting the second proppant into the well bore, the method includes the step of injecting into the well bore a third slurry containing a third proppant at sufficiently high pressures to fracture the subterranean formation to accept the third slurry, wherein the third proppant is coal combustion fly ash particles that have a mean particle size (d50) of 70 to 80 μm.

Still further, the third proppant has a size distribution defined by a d90 of 125 to 145 μm and a d10 of 30 to 40 μm and, more preferably, a d90 of 115 to 140 μm and d10 20 to 30 μm. Still further, the third proppant has a void volume of greater than 50% and, more preferably greater than 55%. Still further, the third proppant has a bulk density of between 0.75 and 1.0 gm/cm$^3$ or 0.9 and 1.1 gm/cm$^3$.

In an alternative embodiment, the third proppant is conventional fracking sand. In yet another alternative embodiment, the third proppant is a mixture of conventional fracking sand and the third fly ash component described above having (a) a size distribution defined by a d90 of 125 to 145 μm and a d10 of 30 to 40 μm and more preferably a d90 of 115 to 140 μm and d10 20 to 30 μm, (b) a void volume of greater than 50% and, more preferably 55% and/or (c) a bulk density of between 0.75 and 1.0 gm/cm$^3$ or 0.9 and 1.1 gm/cm$^3$.

One slurry useful in the method includes water, coal combustion fly ash particles that have a mean particle size (d50) of about 6 microns and a surfactant. The slurry may have a proppant loading of greater than 12 pounds per gallon. In another possible embodiment, the slurry has a proppant loading of 10 to 13 pounds per gallon.

The surfactant used in the slurry may be substantially any surfactant known to be useful for such a purpose. Possible surfactants used in the slurry include, but are not necessarily limited to silanes, melamine, naphthalene sulfonate, polycarboxylate dispersants or combinations thereof. Such surfactants may comprise as much as 2 grams per kilogram of ash in the slurry. The surfactants function to better retain the fly ash particles in suspension in the water of the slurry.

The slurry may also include other additives known to be useful in hydraulic fracking slurries. Those additives include but are not necessarily limited to or pH modifiers including acids and bases and combinations thereof. The pH modifiers function to adjust the pH of the slurry for optimum density and fluidity. The ash slurry may also be used in conjunction with a strong acid "spear" to further enhance the fracking of carbonate containing strata.

Figure 1:
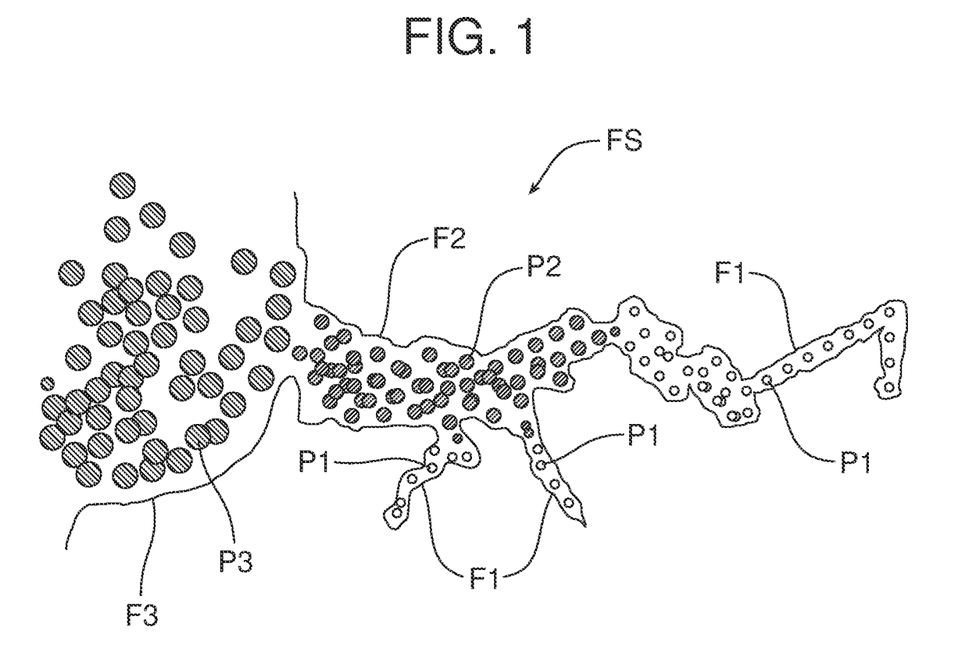
FIG. 1 illustrates how the progressively larger size proppants function to stabilize even the micro factures in the subterranean formation to sustain well yields at higher rates over a longer period of time.

FIG. 1 illustrates a fracture system FS in a subterranean formation after sequentially injecting nano, micro and then macro sized proppants generated from coal ash into the well bore by the above-described method. As shown the first slurry, including the smallest-sized fly ash particles/first proppant P1, is injected first, penetrating deep into the smallest micro fractures F1. As a result, the micro fractures F1 are propped open. Next, the second slurry, including the next largest fly ash particles/second proppant P2, is injected. These particles P2 penetrate into the larger macro fractures F2 and prop them open. Finally, the third slurry, including the still larger or coarser fly ash particles/third proppant P3 is injected. These particles penetrate and prop open the still larger channels C. Together, the proppants P1, P2 and P3 provide a range of particle sizes adapted to prop open the entire fracture system FS in a manner that sustains well yields at higher rates over a longer period of time.

EXPERIMENTAL SECTION

Theory and Practice.
UK's Proppants from Fly Ash (U.S. Pat. No. 10,457,859).

The production of proppants from fly ash may seem counter intuitive as originally the American Petroleum Institute (API) defined them as sand sized materials with a lower size limit of 70 mesh (~300 microns). However, in the past few years this concept has changed, and smaller sized materials have been demonstrated including micro and nano size materials. An ideal proppant would consist of:
- a material that would form a stable fracking slurry that could be pumped easily.
- small particle size that could prop open the smallest of fractures that produce most of the oil and gas.
- packing properties that have enough permeability to permit the flow back of products.

Coal fly ash can be tailored to provide all these properties. There are two physical laws that have a bearing on proppant properties, Stokes and Carman-Kozeny. Stokes' law describes the falling velocity of particles. The small size and low-density of ash derived proppants result in very slow Stokes' Law settling velocities, e.g. 0.03-0.10 cm/s for 20 to 40 µm particle diameters. A typical proppant of 20 to 40 mesh (420 to 840 µm) quartz sand has settling velocities of 16 to 63 cm/sec, or about 300 times faster. Because of this, viscosity modifiers are needed to stabilize sand slurries and maintain suspensions.

It is also critical that the emplaced micro-proppant not only keep micro fractures from healing but also allows good flow of oil or gas through. Flow through a packed bed is described by the Carman-Kozeny which teaches the importance of void volume or porosity (more is better) and surface area (less is better) to allowing fluid flow.

Fly ash consists of round particles with a reasonably narrow size distribution that facilitates the development of void volume when packed. The smoothness of the particles provides for reduced surface area and lowered resistance to flow. The small size of some of the fly ash, typically in the fine silt and clay range, gives an ability to prop micro fractures.

The University of Kentucky CAER has developed and successfully patented the characteristics and methodology to tailor fly ash for proppant application. Using ISO/API standard test procedures, the proppant properties of classified ash were determined and described as follows.

Fly ash is derived from a molten liquid droplet, resulting in a very low surface area to volume ratio. This low surface area results in greatly improved fluid flow in a packed bed. Fly ash achieves scores above 0.90 on both API/ISO roundness and smoothness. This creates packed beds with higher hydraulic conductivity by reducing surface area and increasing void volume thus improving flow dynamics.

Compared to conventional proppants, such as Northern White Quartz (NWQ) ash proppants are found to have lower density (improved Stokes $(\rho_s - \rho)$) and improved void volume ($\epsilon$). For example, compared to NWQ fly ash proppants are less dense by as much as 25% (1.98 to 2.16 vs 2.65 g/cm$^3$). Packing or bulk density is also much lower, for example 20×40 mesh NWQ is 1.63 g/cm$^3$ compared to 0.76 g/cm$^3$ to 0.95 g/cm$^3$ for the much smaller (100×200 mesh) ash proppants. From this, a void volume can be calculated, which is significantly higher for ash-based proppants.

Figure 2:
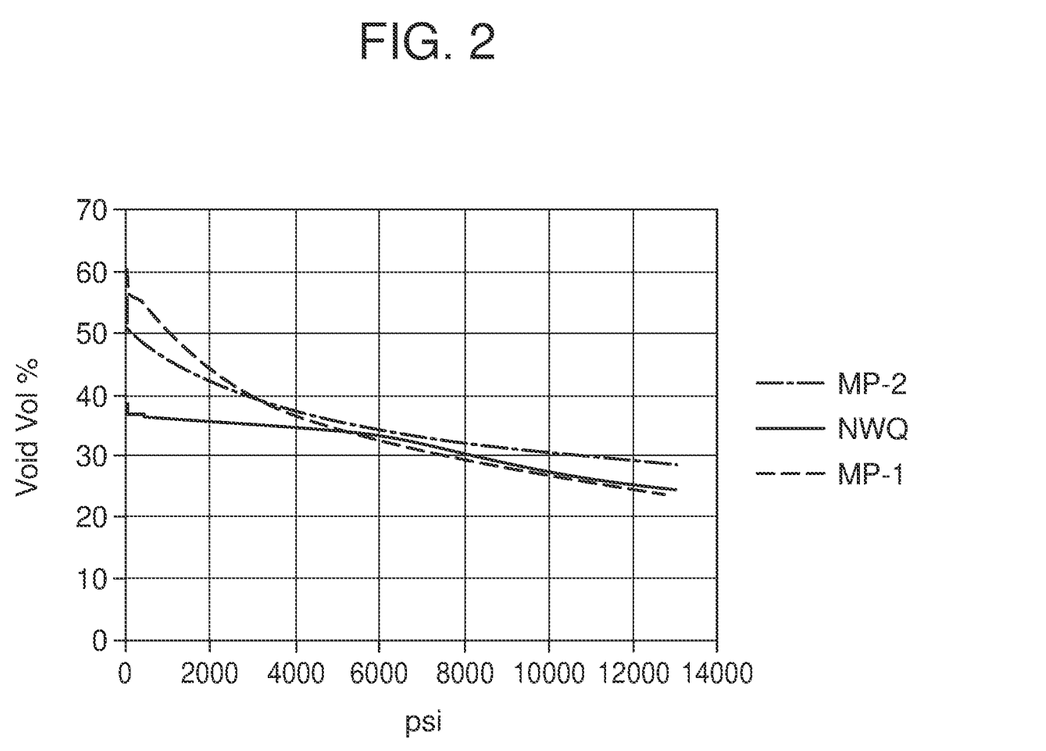
FIG. 2 is a graph illustrating change in void volume with pressure comparing micro-particle fly ash proppants of the type used in the new method to a conventional quartz proppant.

The fly ash proppants are composed of a strong ceramic glass. Proppants are subjected to high pressures. An important parameter is the breakdown of the particles with pressure as defined by crush resistance testing. Data comparing the NWQ and the fly ash micro-proppants indicate the latter show exceptional strength and stiffness at pressures in the 5,000 to 13,000 psi range (See FIG. 2). The micro-proppants have essentially the same void volume over the critical range of 4,000 to 8,000 psi as the quartz. At higher pressures the micro-proppant maintains higher void volume than the NWQ.

The Class F fly ash which the micro proppant is derived from is essentially inert over a broad pH range (~2 to ~12). When mixed with water, a slurry pH typically in the range of about 8 to 10 is formed, which is helpful in stabilizing clay. The fly ash based micro proppant has a glassy surface that readily accepts low cost, environmentally friendly dispersants such as polycarboxylate, melamine and silanes which can be used to adjust the slurry flow dynamics and packing if needed.

Fly ash does have the disadvantage of having a broad particle size range spanning from tens of nanometers to hundreds of microns. This results in efficient packing with most fly ash having very slow hydraulic conductivity, in the range of 10-5 to 10-6 cm/sec. Processing fresh and ponded ash to narrow their size distribution using pneumatic, hydraulic or screening techniques, or a combination thereof, finds that the hydraulic conductivities of ash proppants are relatively easy to increase. Tests on beneficiated fly ash, conducted with the falling head method to define hydraulic conductivity found conductivity as high as 10-4 cm/sec for hydraulic classification alone with 10-2 cm/s achieved when combined with screening. Thus, a small ash-based proppant (e.g. 30-70 µm d50) can achieve the permeability of a much coarser silt and sand sized material.

Métis Liquid Frac Technology (Patent Application Publication 2018/0362841 A1).

Métis has demonstrated the value of fly ash in fracking, both oil and gas wells. The advancements of the Liquid Frac technology over conventional approaches include:
- Lower power requirements by up to 95%.
- Reduced equipment footprints and smaller frac site spreads.
- Elimination of viscosity modifiers, with simpler and cheaper post frac cleanup.
- Slower production yield declines.
- Simpler and safer fracking operations.
- Improved results in re-fracking of old oil and gas wells.
- Cost reductions of up to 50%.

The low settling velocity of fly ash produces proppant slurries with low viscosity that can be readily pumped long distances without phase separation. The high loadings achievable with fly ash micro proppant (up to 12.5 pounds per gallon) results in slurries with hydrostatic pressure that frequently exceed the frack pressure of the formation being treated. Thus, most of the work can be done with this "hydraulic horsepower". This factor should not be underemphasized as it is revolutionary. Métis has been able to substitute conventional concrete pumps for this application, using 2,500 hp pumps to do the work of 50,000 hp. Also, the reduction or elimination of high-velocity high-pressure pumping equipment results in smaller well sites and safer operations.

Métis Energy's approach, using fly ash micro proppants, focuses on the creation and propping of micro fractures using a "go slow" approach and encouraging leak off. The approach taken in conventional fracking is to grow and prop the main fractures and fight pressure leak off. The results to date indicate that this is highly effective. Long term fracture conductivity tests were performed on a 0.01 mD sandstone and used a Class F fly ash proppant. Fracture conductivity of 0.779 mD·ft was obtained, equivalent to a dimensionless fracture conductivity of 10. Prats work showed dimensionless fracture conductivity >20 does not cause significant production increase. This implies the fly ash micro proppant would create a longer open fracture with greater production.

Figure 3:
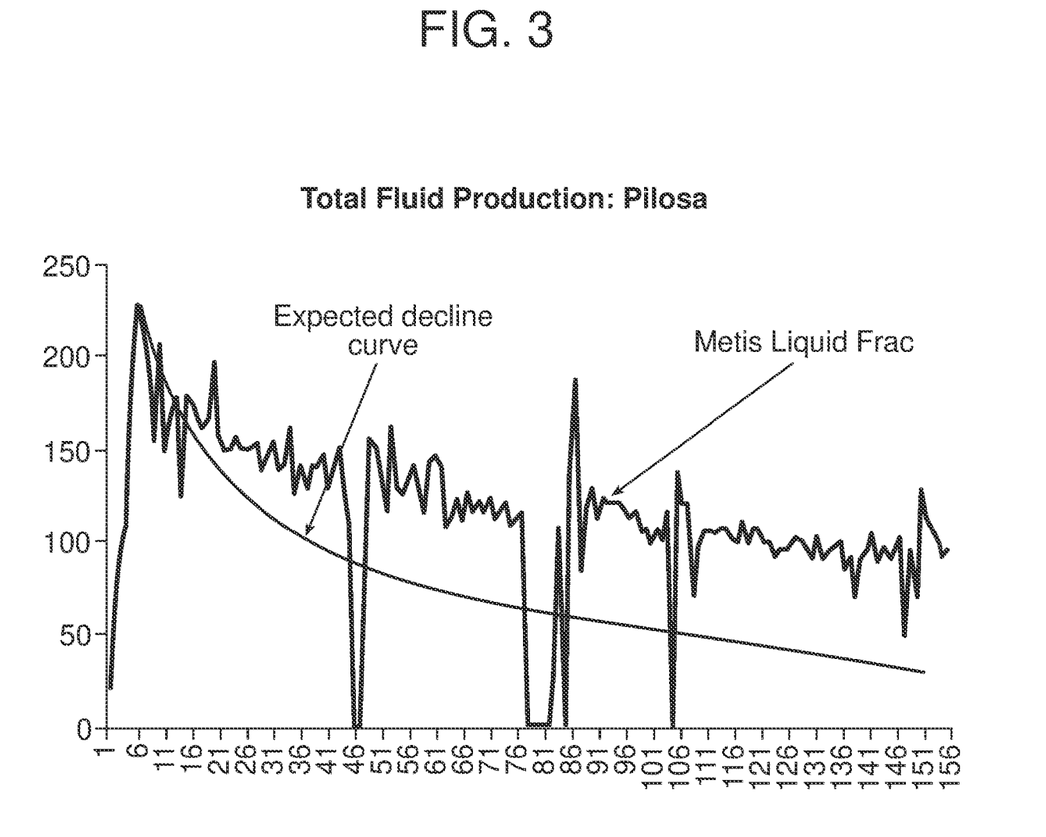
FIG. 3 is a graph illustrating how the new method using fly ash micro-proppants increases and extends production when compared to what is typical for other wells in the same field.

Data demonstrates that, although early, the use of microproppants increases and extends production. For example, the production from a Zavala County, Texas oil well (FIG. 3), demonstrated a much lower decline curve than typical for other fracked wells in this field.

Métis Liquid Frack technology can use water for fracking jobs without chemical additives such as cross-linked viscosity modifiers (gelling agents such as gaur). The elimination of viscosity modifiers and other chemicals results in simpler, less expensive, and more effective post-fracking well clean up.

The stability of fly ash-based proppant slurries has resulted in simpler and very forgiving operations. Fracking could be restarted after several hours of stoppage.

The stable dense slurries can also be gravity fed into small well diameters, including tubing, which would be perfect for re-fracking dead wells. The combination of lower power requirements, reduced slurry costs and the elimination of post fracking well cleanup results in substantial cost savings. For example, the cost of re-fracking a gas well in LaSalle County, Texas to the original production level was only half that for the original conventional frac, with one demonstration well paying for itself within 10 weeks of operations. Progressive Multi-Staged Liquid Fracking Proppant Injection Technology.

Progressive Multi-Staged Liquid Fracking Proppant Injection or "Multi-Frac",

How Multi Frac Works. The first step in the Multi Frac technology is the separation of the fly ash into different frac slurry particle size types with greatly narrowed size distribution. The narrowing of the size distributions creates a more fluid like slurry.

The smallest particles P1 form a frac slurry that will prop the finest fractures F1 with the slowest permeability (often in the micro and milli Darcy range). These micro fractures F1 produce the bulk of the oil and gas but are the most difficult to stabilize. The second fraction of ash P2 is coarser, with greater hydraulic conductivity, and is used to create a continuity of fractures F2 with increasing permeability, essentially creating connector "roadways" that allow the oil and gas to flow from the microfractures F1 (FIG. 1). Another even coarser proppant P3 with greater conductivity is used to connect the channels F3 from the first two fracs into larger concentration flow channels. The hydraulic conductivity of the proppant pack is matched to permeability of the fractures in the reservoir rock going from smaller to larger for both. This is analogous to the traffic flow of one lane country roads connected to two lane state highways connected to a superhighway.

Figure 4:
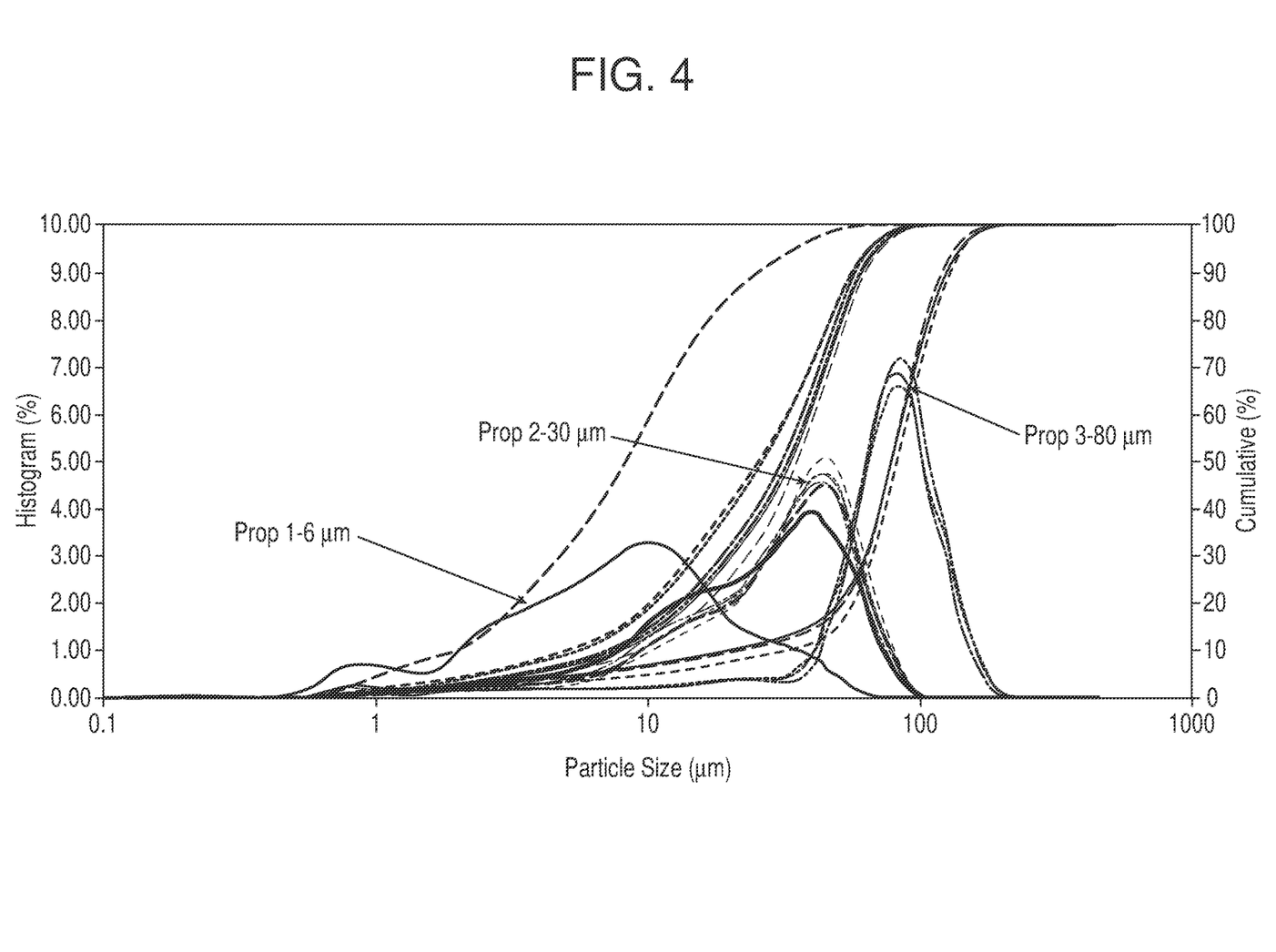
FIG. 4 illustrates the size distribution of ash slurries that were produced from ponded Class F fly ash at the Cardinal demonstration of hydraulic classification technology.

The practicality of this is in part is illustrated in FIG. 4, which presents the size distribution of ash slurries that were produced from the ponded Class F fly ash at the Cardinal demonstration of the UK CAER hydraulic classification technology.

There are three clearly identifiable sized materials that were produced from this ash. The finest or first proppant P1, has a mean particle diameter, or d(50), of about 6 μm, with a substantial fraction of ash particles that fall well into the sub-micron or nanometer range. This material forms the first frac slurry which will be used to drive open and prop facture channels with only micro and milli Darcy permeability.

The injection of proppant P2, with a d(50) of 20 to 40 μm, stabilizes and connects fractures and channels that are larger. Proppant P3 has a d(50) of 70 μm and may be part of a near well bore gravel pack. The Multi Frac approach produces a continuity of propped fractures, from those with only micro and millidarcies of permeability to the larger open flow "gravel pack" channels. The propping of the micro fractures is critical to help to sustain well yields.

Multi-Frac consumes the entire ash resource from the finest fraction to the largest. Or alternatively, some ash components such as cenospheres and magnetite may be separated and utilized elsewhere, for example in drilling mud and well cement. Additionally, there is the potential to utilize multiple types of fly ash or supplement the coarser near well-bore materials with conventional proppant sands or blends of sands with ash derived proppants.

More significantly, Multi-Frac extends the geographic range and types of ash that can be utilized. Most of the successful Liquid Frac tests have utilized the fly ash produced at the San Miguel power station, located in Christine, Texas. This plant is run on lignite and produces a fly ash that is different from that produced in the Eastern U.S. It is coarser, less dense, and much lower in loss on ignition (LOI), and $Fe_2O_3$ compared to typical eastern ash. Of significance, it also produces a slurry that has a pH above 10, which stabilizes clays and helps prevent the formation of flocs. Table 1 presents a comparison of it with an ash produced at the Cardinal Power plant in Ohio, typical eastern U.S. bituminous ash. The San Miguel produces a frac slurry that is highly stable due its pH and low density, and it is also capable of very high loadings.

Modifying an Eastern Bituminous ash by classifying it in into multiple fracking slurries accomplishes the same result. Narrowing the size distribution of the slurry increases its fluidity by reducing internal shear due to differential settling. If critical velocities are maintained, they can be pumped long distances without problem. Small dosages of common surfactants such as melamine, naphthalene sulfonate and polycarboxylates dispersants also have a major impact on the stability of fly ash slurries. This tool can be used to eliminate floc formation, enhance slurry stability and separate the finest fraction of ash. Preliminary data also indicate that a type of commonly available silane may improve hydraulic conductivity through the modification of the hydrophobicity of the ash surface. Multi-Frac represents the next stage in fly ash proppant application and provides several significant advantages that include:

Frac slurries with narrow size distribution with enhanced stability and fluidity.

Microfracture stabilization.

Progressive particle size slurries that provide a continuum of conductivity for oil and gas flowback.

Extended gas and oil yields.

Expanded ash resource including ponded, landfilled and run of plant over a broad geographic region.

Higher slurry loadings increased "hydraulic horsepower", reduced energy cost.

Greatly reduced fracking costs.

TABLE 1

Comparison of San Miguel and Eastern Bitumenous Fly Ash

|  | $SiO_2$ | $Al_2O_3$ | $Fe_2O_3$ | CaO | MgO | $Na_2O$ | $K_2O$ | $P_2O_5$ | $TiO_2$ | $SO_3$ | LOI |
|---|---|---|---|---|---|---|---|---|---|---|---|
| San Miguel | 64.08 | 19.22 | 1.9 | 5.22 | 0.57 | 3.84 | 2.06 | 0.03 | 1.04 | 0.39 | 0.1 |
| Ohio | 53.27 | 27.61 | 9.64 | 3.25 | 1.02 | 0.15 | 2.17 | 0.12 | 1.26 | 1.74 | 3.3 |

|  | d10 μm | d50 μm | d90 μm | ρ g/cm3 | pH |
|---|---|---|---|---|---|
| San Miguel | 17 | 80 | 182 | 1.7-1.8 | 10.6 |
| Ohio | 5.6 | 26 | 80 | 2.0-2.4 | 8.6 |

Technology for the Generation of Multi-Frac Slurry.

There are multiple options for the processing of ash to produce Multi-Frac slurries. Pneumatic, hydraulic and screening methodologies all could play a role depending on the nature of the ash. For example, the San Miguel is currently pneumatically classified at the power plant before shipping. At least initially, the most effective method may be processing the ash at the well site using portable truck mounted equipment. The UK CAER has developed, demonstrated and patented the hydraulic technology that is capable of processing fly ash for proppant production from fly ash. The technology is a cross flow lamellae hydraulic classifier that can separate fly ash slurries by size by varying the lamellae spacing and the rate of the feed.

The principles of operation are relatively simple. The finest materials flow out the top, while the coarser ash flows down the lamellae, to thickening cones. The first cones in series collects the densest and largest ash. The second cone collects material that is smaller in size. A commercial sized cell was successfully demonstrated at a ash pond at the Cardinal Power plant located in Brilliant, Ohio. The technology was designed to be flexible, simple, portable and inexpensive, offering broad range of process configurations. During operations in Ohio, the demonstration unit was fed from a dredge and operated at feed rates as high as 12.2 tons per hour ash. Readily pumpable ash slurry densities of between 1.4 and 1.5 g/cm were achieved, equivalent to 50% to 60% by weight of ash (or ~10 to 13 lbs./gal loadings).

In the longer term it may make sense to process the ash at the power plant and deliver it to the well site in pneumatic tankers. This would require a large outlay of capital but overall may be more efficient.

Environmental and Economic Benefits of Multi-Frac.

Significant economic benefits from fly ash proppant production includes the potential for the recovery of substantially additional oil and gas, while simultaneously consuming millions of tons of fly ash.

The use of ash as a micro proppant represents a new market opportunity. High fluid loading rates of up to 12.5 pounds per gallon, results in consumption rates of up to 2,000 lbs. per foot of fracked well. This puts the potential utilization in million tons per year, on a par with that used in concrete currently.

The proppant market is also large. Beroe Market Intelligence estimated the pre covid North American consumption of proppants to be 89.9 million tonnes, with 111 million tonnes world-wide, with projected growths rates of 15% to 20%. Although the current market pricing for oil will dampen growth in the short term, the potential for this application is still vast.

The reduction or elimination of the need for high-power high-pressure pumps result in reduced capital, power and well site footprint. This combined with higher and longer-term gas and oil yields can reduce fracking cost by 50% or more. This is now of critical importance to the survival of the industry.

Another significant environmental and product benefit will be the improvements in re-fracking. The high loadings possible with fly ash allows the use of small diameter tubing ideal for refracking old oil and gas wells. Bringing post-mature oil and gas fields back to life reduces the need for new developments and stretches and conserves conventional resources Additionally, the ash is stored thousands of feet underground, eliminating the need for landfill and pond storage as well as the potential environmental release of trace metals and other contaminates via leaching.

This disclosure may be considered to relate to the following items:

1. A method of hydraulic fracturing of a subterranean formation having a well bore, comprising: injecting into the well bore a first slurry containing a first proppant at sufficiently high pressures to fracture the subterranean formation to accept the first slurry, wherein the first proppant is coal combustion fly ash particles that have a mean particle size (d50) of about 6 to 8 microns (μm).

2. The method of item 1, wherein the first proppant has a size distribution defined by a d90 of about 35 μm and d10 of about 2 μm.

3. The method of item 1, wherein the first proppant has a void volume of greater than 40% in accordance with standard ISO tests.

4. The method of item 1, wherein the first proppant has a particle density of between 2.05 and 2.4 g/cm$^3$.

5. The method of any of items 1-4, further including, after the injecting of the first proppant, injecting into the well bore a second slurry containing a second proppant at sufficiently high pressures to fracture the subterranean formation to accept the second slurry, wherein the second proppant is coal combustion fly ash particles that have a mean particle size (d50) of about 25-35 μm.

6. The method of item 5, wherein the second proppant has a size distribution defined by a d90 of 50 to 70 μm and d10 of 6 to 14 μm.

7. The method of item 5, wherein the second proppant has a void volume of greater than 45%.

8. The method of item 5, wherein the second proppant has a particle density of between 1.98 and 2.3 g/cm$^3$ and a bulk density of 0.8 to 1.2 gm/cm$^3$.

9. The method of item 5, further including, after the injecting of the second proppant, injecting into the well bore (a) a third slurry containing a third proppant at sufficiently high pressures to fracture the subterranean formation to accept the third slurry, wherein the third proppant is coal combustion fly ash particles that have a mean particle size (d50) of 70 to 80 μm or (b) a mixture of the third proppant and conventional fracking sand.

10. The method of item 9, wherein the third proppant has a size distribution defined by a d90 of 115 to 145 μm and d10 20 to 40 μm.

11. The method of item 9, wherein the third proppant has a void volume of greater than 50%.

12. The method of item 9, wherein the third proppant has a bulk density of between 0.75 and 1.1 gm/cm$^3$.

13. The method of item 9, wherein the first proppant has a size distribution defined by a d90 of 35 μm and a d10 of 2 μm, a void volume of greater than 40% and a bulk density of between 0.9 and 1.2 gm/cm$^3$.

14. The method of item 13, wherein the second proppant has a size distribution defined by a d90 of 50 to 70 μm and a d10 of 6 to 14 μm, a void volume of greater than 45%, and a particle density of between 1.98 and 2.3 gm/cm$^3$ and a bulk density of 0.8 to 1.2 gm/cm$^3$.

15. The method of item 14, wherein the third proppant has a size distribution defined by a d90 of 115 to 145 μm and a d10 of 20 to 40 μm, a void volume of greater than 50% and a bulk density of between 0.75 and 1.1 gm/cm$^3$.

16. The method of item 5, further including, after the injecting of the second proppant, injecting into the well bore a third slurry containing a third proppant at sufficiently high pressures to fracture the subterranean formation to accept the third slurry, wherein the third proppant is conventional fracking sand.

17. A slurry for hydraulic fracturing of a subterranean formation having a well bore, comprising: water, coal combustion fly ash particles that have a mean particle size (d50) of about 6 to 8 microns and a surfactant.

18. The slurry of item 17, comprising a proppant loading of greater than 12 pounds per gallon.

19. The slurry of item 17, comprising a proppant loading of 10 to 13 pounds per gallon.

20. The slurry of any of items 17-19, wherein the surfactant is selected from a group consisting of melamine, naphthalene sulfonate, polycarboxylate dispersants or a combinations thereof.

21. The slurry of any of items 17-19, wherein the proppant has a size distribution defined by a d90 of about 35 μm and d10 of about 2 μm.

22. The slurry of item 21, wherein the proppant has a void volume of greater than 40% in accordance with standard ISO tests.

23. The slurry of item 22, wherein the proppant has a particle density of between 2.05 and 2.4 g/cm$^3$.

24. The slurry of any of items 17-19, wherein the proppant has a void volume of greater than 40% in accordance with standard ISO tests.

25. The slurry of any of items 17-19, wherein the proppant has a particle density of between 2.05 and 2.4 g/cm$^3$.

Each of the following terms written in singular grammatical form: "a", "an", and the ", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value. Use of the terms parallel or perpendicular are meant to mean approximately meeting this condition, unless otherwise specified.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of hydraulic fracturing of a subterranean formation having a well bore, comprising: injecting into the well bore a first slurry containing a first proppant at sufficiently high pressures to fracture the subterranean formation to accept the first slurry, wherein the first proppant is coal combustion fly ash particles that have a mean particle size (d50) of about 6 to 8 microns (μm);

after the injecting of the first proppant, injecting into the well bore a second slurry containing a second proppant at sufficiently high pressures to fracture the subterranean formation to accept the second slurry, wherein the second proppant is coal combustion fly ash particles that have a mean particle size (d50) of about 25-35 μm; and after the injecting of the second proppant, injecting into the well bore (a) a third slurry containing a third proppant at sufficiently high pressures to fracture the subterranean formation to accept the third slurry, wherein the third proppant is coal combustion fly ash particles that have a mean particle size (d50) of 70 to 80 μm or (b) a mixture of the third proppant and fracking sand.

2. The method of claim 1, wherein the first proppant has a size distribution defined by a d90 of about 35 μm and d10 of about 2 μm.

3. The method of claim 1, wherein the first proppant has a void volume of greater than 40% in accordance with standard ISO tests.

4. The method of claim 1, wherein the first proppant has a particle density of between 2.05 and 2.4 g/cm$^3$.

5. The method of claim 1, wherein the second proppant has a size distribution defined by a d90 of 50 to 70 μm and d10 of 6 to 14 μm.

6. The method of claim 1, wherein the second proppant has a void volume of greater than 45%.

7. The method of claim 1, wherein the second proppant has a particle density of between 1.98 and 2.3 g/cm$^3$ and a bulk density of 0.8 to 1.2 gm/cm$^3$.

8. The method of claim 1, wherein the third proppant has a size distribution defined by a d90 of 115 to 145 μm and d10 20 to 40 μm.

9. The method of claim 1, wherein the third proppant has a void volume of greater than 50%.

10. The method of claim 1, wherein the third proppant has a bulk density of between 0.75 and 1.1 gm/cm$^3$.

11. The method of claim 1, wherein the first proppant has a size distribution defined by a d90 of 35 μm and a d10 of 2 μm, a void volume of greater than 40% and a bulk density of between 0.9 and 1.2 gm/cm$^3$.

12. The method of claim 11, wherein the second proppant has a size distribution defined by a d90 of 50 to 70 μm and a d10 of 6 to 14 μm, a void volume of greater than 45%, and a particle density of between 1.98 and 2.3 gm/cm$^3$ and a bulk density of 0.8 to 1.2 gm/cm$^3$.

13. The method of claim 12, wherein the third proppant has a size distribution defined by a d90 of 115 to 145 μm and a d10 of 20 to 40 μm, a void volume of greater than 50% and a bulk density of between 0.75 and 1.1 gm/cm$^3$.

* * * * *